US006415482B1

(12) United States Patent
Pontaoe

(10) Patent No.: US 6,415,482 B1
(45) Date of Patent: Jul. 9, 2002

(54) ATTACHMENT FOR ZIPPER CORD

(75) Inventor: John S. Pontaoe, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/603,571

(22) Filed: Jun. 23, 2000

(51) Int. Cl.[7] .......................... A44B 19/26; F16G 11/03
(52) U.S. Cl. .................. 24/429; 24/129 R; 24/300; 24/419
(58) Field of Search ................ 24/429, 419, 129 R, 24/130, 300; 294/3.6

(56) References Cited

U.S. PATENT DOCUMENTS

| | | | | |
|---|---|---|---|---|
| 3,641,634 A | * | 2/1972 | Asai ........................... 24/429 |
| 4,162,561 A | * | 7/1979 | Tillemans ................. 24/129 R |
| 4,389,758 A | | 6/1983 | Akashi |
| 4,873,750 A | | 10/1989 | Tracy |
| 5,136,758 A | | 8/1992 | Wilcox et al. |
| 5,283,930 A | | 2/1994 | Krauss |
| 5,347,692 A | * | 9/1994 | Ebata ........................ 24/429 |
| 5,351,367 A | | 10/1994 | Kennedy et al. |
| D355,147 S | | 2/1995 | Frano |
| 5,416,951 A | * | 5/1995 | Keyaki et al. ................ 24/429 |
| 5,504,977 A | | 4/1996 | Weppner et al. |
| 5,522,120 A | * | 6/1996 | Brinning ..................... 24/130 |
| 5,690,444 A | * | 11/1997 | Yuuki et al. ................... 24/429 |
| 5,735,329 A | | 4/1998 | Akins et al. |
| 5,911,369 A | | 6/1999 | Yamazaki |
| 6,044,527 A | * | 4/2000 | Ishida et al. .............. 24/129 R |
| 6,058,578 A | * | 5/2000 | Lan ............................. 24/429 |

FOREIGN PATENT DOCUMENTS

EP 0 173 891 A1 3/1986

OTHER PUBLICATIONS

US 5,875,524, 03/1999, Anscher (withdrawn)

* cited by examiner

Primary Examiner—Victor N. Sakran
(74) Attorney, Agent, or Firm—Pitney, Hardin, Kipp & Szuch LLP

(57) ABSTRACT

The zipper cord attachment includes a male element and a female element. The male element includes cord channels for engaging and securing the ends of a zipper cord or similar cord. The male element includes a guide ridge complementary to a guide slot within the female element. The female element includes ramped surfaces proximate to an end of the guide slot to detent engage a transverse wall of the male element. After installation, pulling on the cord urges the male element more tightly into the female element. That is, pulling on the cord tightens the grip on the ends of the cord by points or striations formed on the male element and supports formed on the female element.

19 Claims, 7 Drawing Sheets

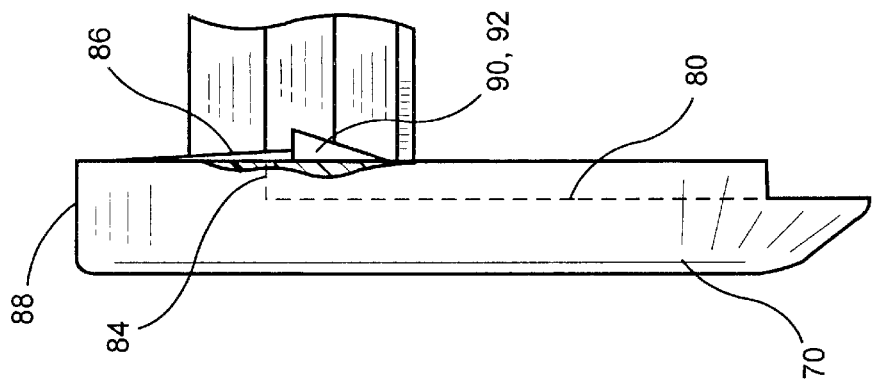
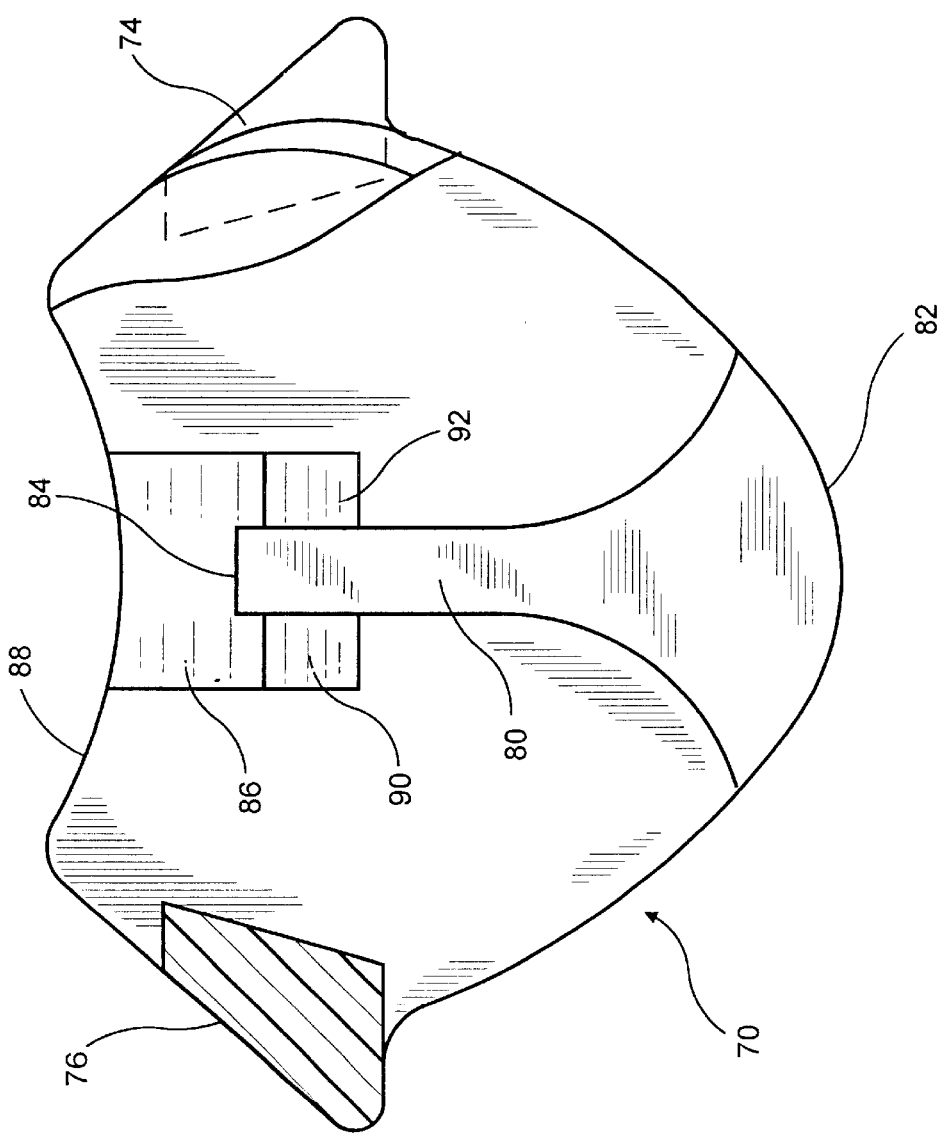

ATTACHMENT FOR ZIPPER CORD

BACKGROUND OF THE INVENTION

1. Field of the Invention

This invention pertains to an attachment for a zipper cord, whereby a loop of cord is securely and easily fixed through the eyelet of a slider of a zipper, or similar aperture.

2. Description of the Prior Art

In the prior art, it is known to provide a pull-tab, loops of cord or similar attachments to a slider of a zipper to aid the user in sliding the zipper slider back and forth while opening and closing the zipper.

U.S. Patent No. 5,911,369 entitled "Pull-Tab Connector for Slide-Fastener Slider" issued on Jun. 15, 1999 to Yamazaki discloses an open strand that is inserted into the connector and tied together. U.S. Pat. No. 5,875,524 entitled "Zipper Pull Cord Fastener" issued on Mar. 2, 1999 to Anscher discloses cord ends that are held in place by a structure that pivots around a screw shaft. U.S. Pat. No. 5,504,977 entitled "Device for Releasably Holding Cords" issued on Apr. 9, 1996 to Weppner et al. discloses two shell halves wherein cord ends are received and captured by shell halves. U.S. Design Patent No. 355,147 entitled "Zipper Pull" issued to Frano on Feb. 7, 1995 discloses two clamping pieces that rotatably clamp on cord ends. However, these references do not provide a simple aesthetic way to secure a length of cord to an eyelet on a zipper slider or other similar aperture.

Other prior art references include U.S. Pat. No. 5,735,329 entitled "Connector for Pull Cords" issued on Apr. 7, 1998 to Akins et al.; U.S. Pat. No. 5,351,367 entitled "Line Tensioner" issued on Oct. 4, 1994 to Kennedy et al.; U.S. Pat. No. 5,283,930 entitled "Cord Clamp with Hasp for Folded Cords and the Like" issued on Feb. 8, 1994 to Krauss; U.S. Pat. No. 5,136,758 entitled "Zipper Attachment Device" issued on Aug. 11, 1992 to Wilcox et al.; U.S. Pat. No. 4,873,750 entitled "Attachment for Slide Fastener Slider Pull Tab" issued on Oct. 17, 1989 to Tracy; and U.S. Pat. No. 4,389,758 entitled "Ornamental Attachment for Slide Fastener Sliders" issued on Jun. 28, 1983 to Akashi.

OBJECTS AND SUMMARY OF THE INVENTION

It is therefore an object of the present invention to provide a secure attachment between a zipper cord and an eyelet of a slider of a zipper or a similar aperture.

It is therefore a further object of the present invention to provide an attachment for a zipper cord to an eyelet of a slider of a zipper or a similar aperture in an aesthetically pleasing configuration.

It is therefore a still further object of the present invention to provide an attachment for a zipper cord to an eyelet of a slider of a zipper or a similar aperture which is simple to install.

It is therefore a still further object of the present invention to provide an attachment for a zipper cord to an eyelet of a slider of a zipper or a similar aperture which is inexpensive to manufacture.

It is therefore a still further object of the present invention to provide an attachment for a zipper cord to an eyelet of a slider of a zipper or a similar aperture which tightens on the ends of the cord, as the attachment is pulled in normal use or by other tensile stressing of the cord.

These and other objects are attained by providing an attachment for a zipper cord which includes a female portion and a male portion. The female portion includes the shell or exterior of the body of the attachment. The female portion is hollow and includes interior guiding grooves, at least one of which terminates proximate to detent ramps. The male portion includes a central element with wing portions on both sides thereof. Slots are formed between the central element and the wing portions into which ends of a cord are inserted. The interior of the distal ends of the wing portions include barbs directed toward the central element which serve to grip the ends of the cord tightly. The central element further includes a transverse ridge which is detent engaged by the detent ramps when the male element is fully inserted into the female element.

BRIEF DESCRIPTION OF THE DRAWINGS

Further objects and advantages of the invention will become apparent from the following description and claims, and from the accompanying drawings, wherein:

FIG. 3 is a plan view of the interior of one of the walls of the female element of the zipper attachment of the present invention.

FIG. 4 is a side plan view, partially in phantom, of the interior of one of the walls of the female element of the zipper attachment of the present invention.

DETAILED DESCRIPTION OF THE PREFERRED EMBODIMENT

Figure 1:
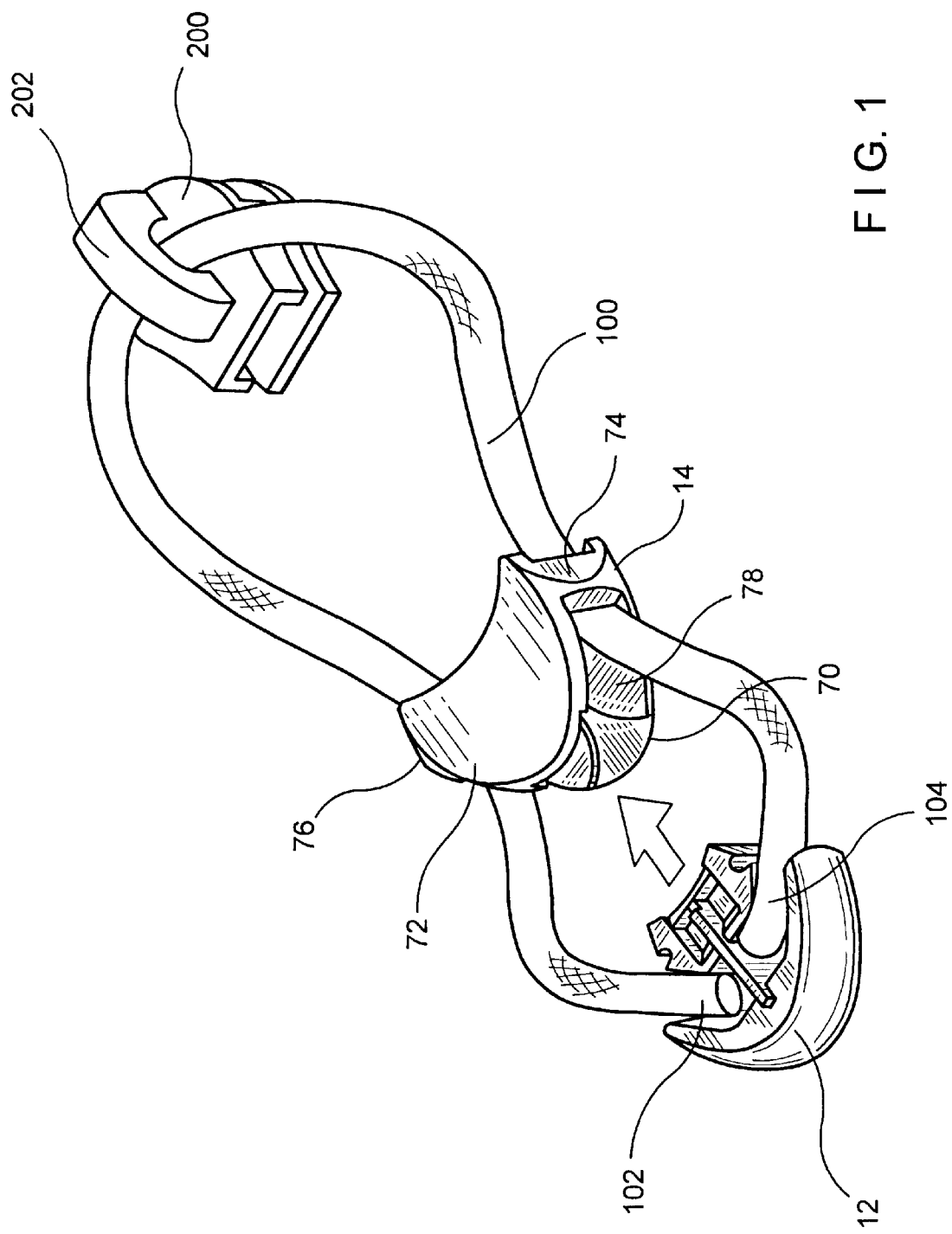
FIG. 1 is a perspective view of the pre-load position of the attachment of the present invention, with respect to a zipper cord and a zipper slider.

Referring now to the drawings in detail wherein like numerals refer to like elements throughout the several views, one sees that FIG. 1 is a perspective view of the pre-loaded configuration of zipper attachment 10, including male element 12 and female element 14, engaging cord 100 which is looped through eyelet 202 of zipper slider 200. Ends 102, 104 of cord 100 are inserted into male element 12.

Figure 2:
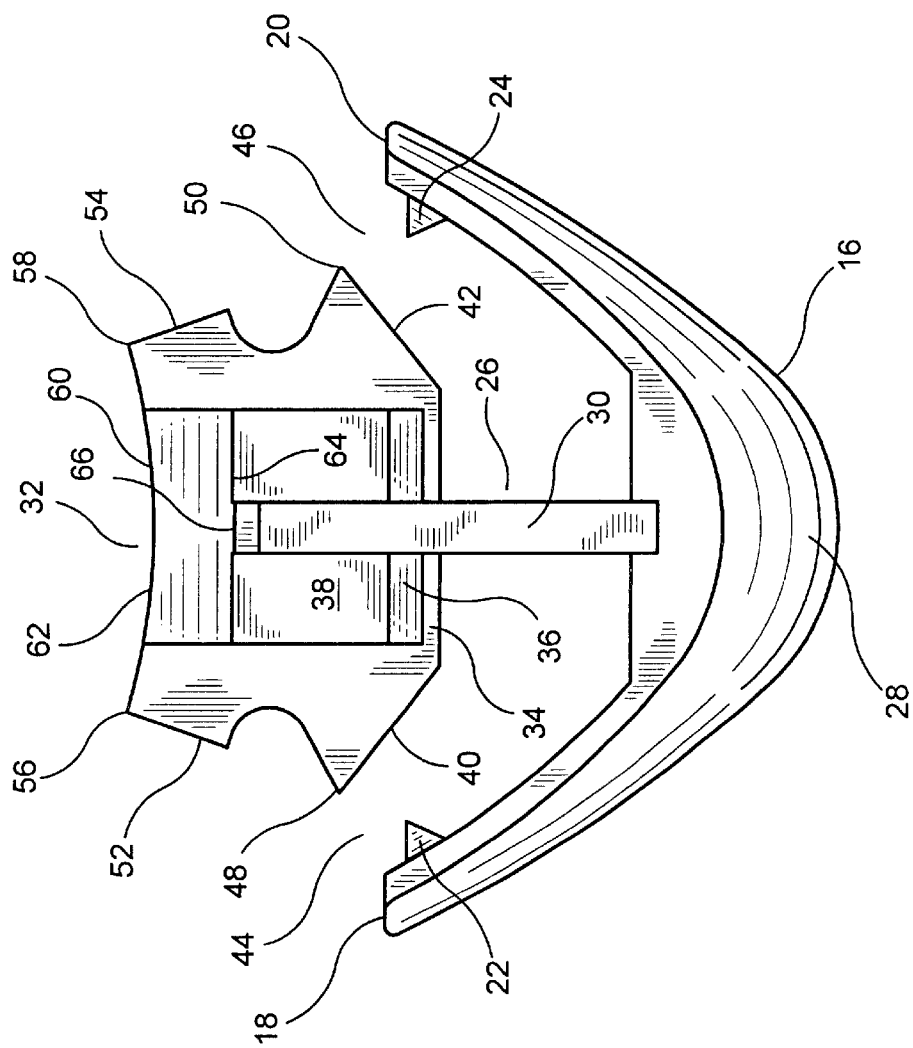
FIG. 2 is a plan view of the male element of the zipper attachment of the present invention.

As shown in FIG. 2, male element 12 includes rounded exterior surface 16 terminating in first and second wings 18, 20 with inwardly extending barbs 22, 24, respectively, which act as interference points to hold the ends 102, 104 of cord 100 in place until the zipper attachment 10 is assembled. Central shank 26 joins at the crown 28 of first and second wings 18, 20 and further includes longitudinal guide ridge 30. Central shank 26 likewise joins enlarged boss portion 32. Enlarged boss portion 32 includes lower wall 34 downwardly adjacent from ramped wall 36 leading to indentation 38. Lateral outwardly sloped walls 40, 42 are formed on the ends of lower wall 34 and face inwardly extending barbs 22, 24 thereby forming respective cord channels 44, 46 into which ends 102, 104 of cord 100 (see FIG. 1) are received.

Outwardly sloped walls 40, 42 terminate in points 48, 50 which engage ends 102, 104 of cord 100 after assembly of zipper attachment 10. Arcuate walls 52, 54 recede from points 48, 50 and join ends 56, 58 of concave upper wall 60. Upper ramped edge 62 is formed below concave upper wall 60 thereby bounding upper detent wall 64 of indentation 38. Guide ridge 30 terminates prior to reaching upper detent wall 64 of indentation 38 thereby forming wall segment 66 which is colinear with guide ridge 30 but has an elevation equal to that of upper detent wall 64. Male element 12 has an identical structure when viewed from the reverse side, or when viewed after being rotated 180 degrees about a vertical axis in the configuration illustrated in FIG. 2.

Figure 6:
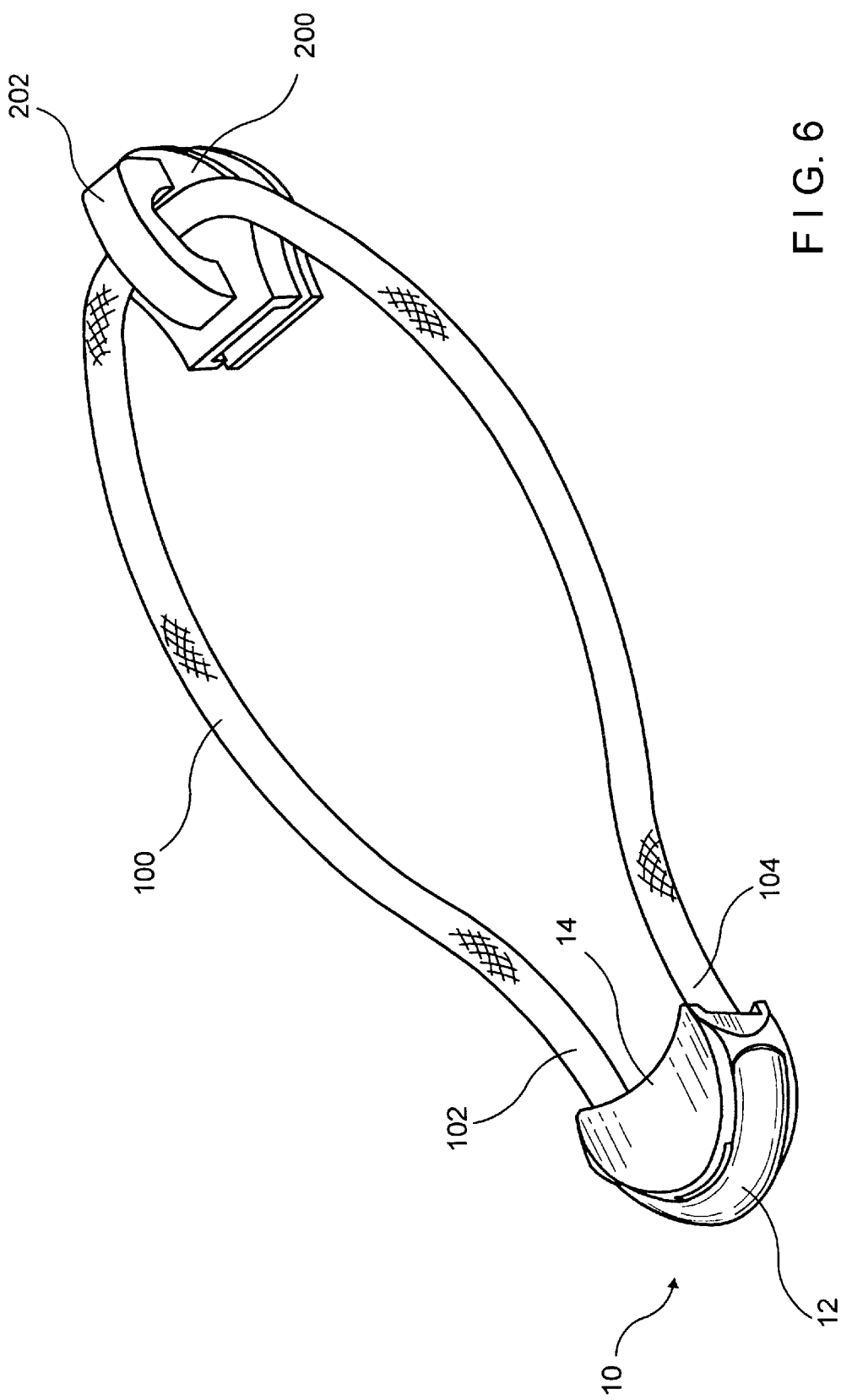
FIG. 6 is a first perspective view of the zipper attachment of the present invention, as installed with respect to the zipper cord and zipper slider.
Figure 7:
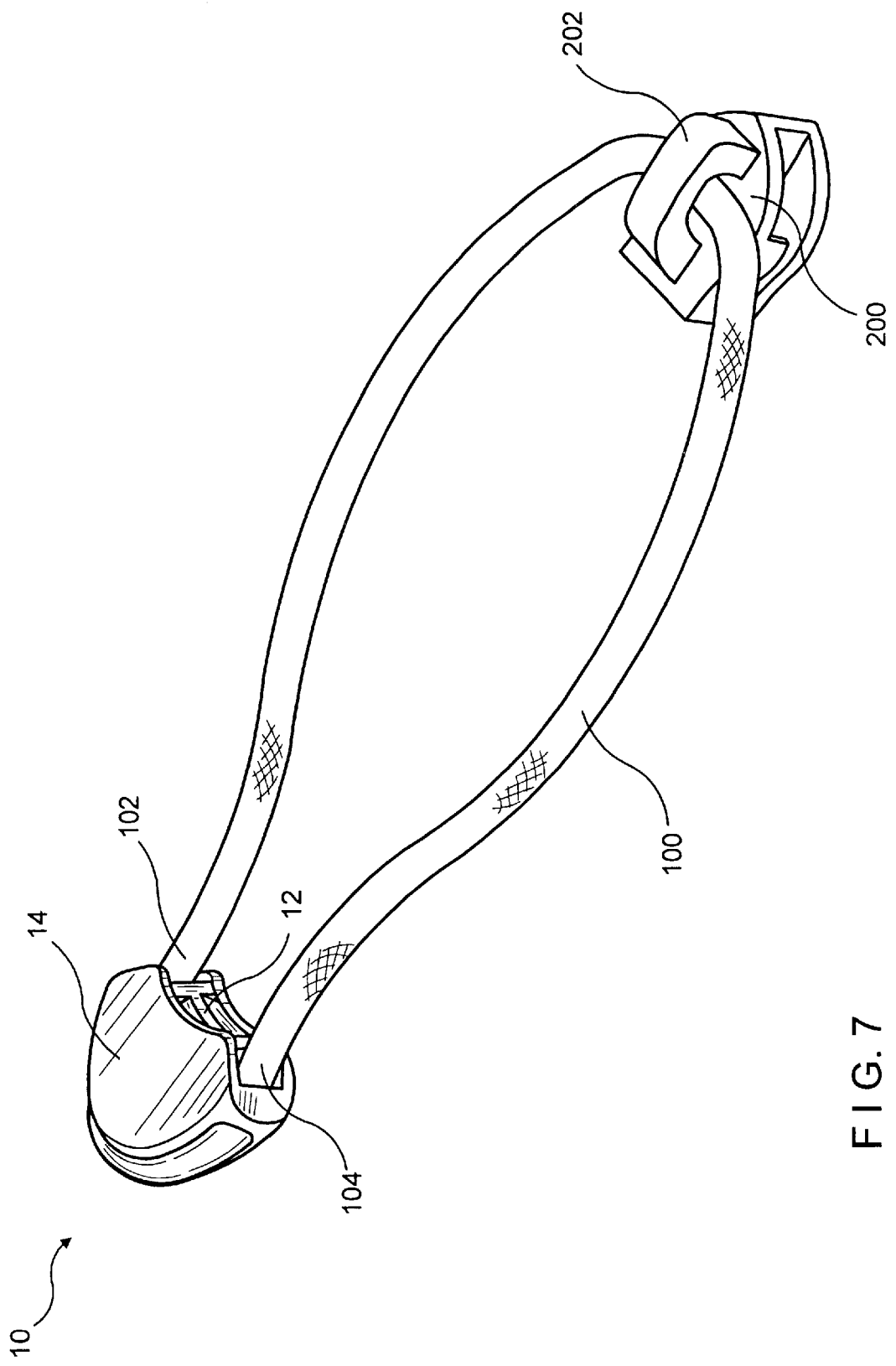
FIG. 7 is a second perspective view of the zipper attachment of the present invention, as installed with respect to the zipper cord and zipper slider.
Figure 8:
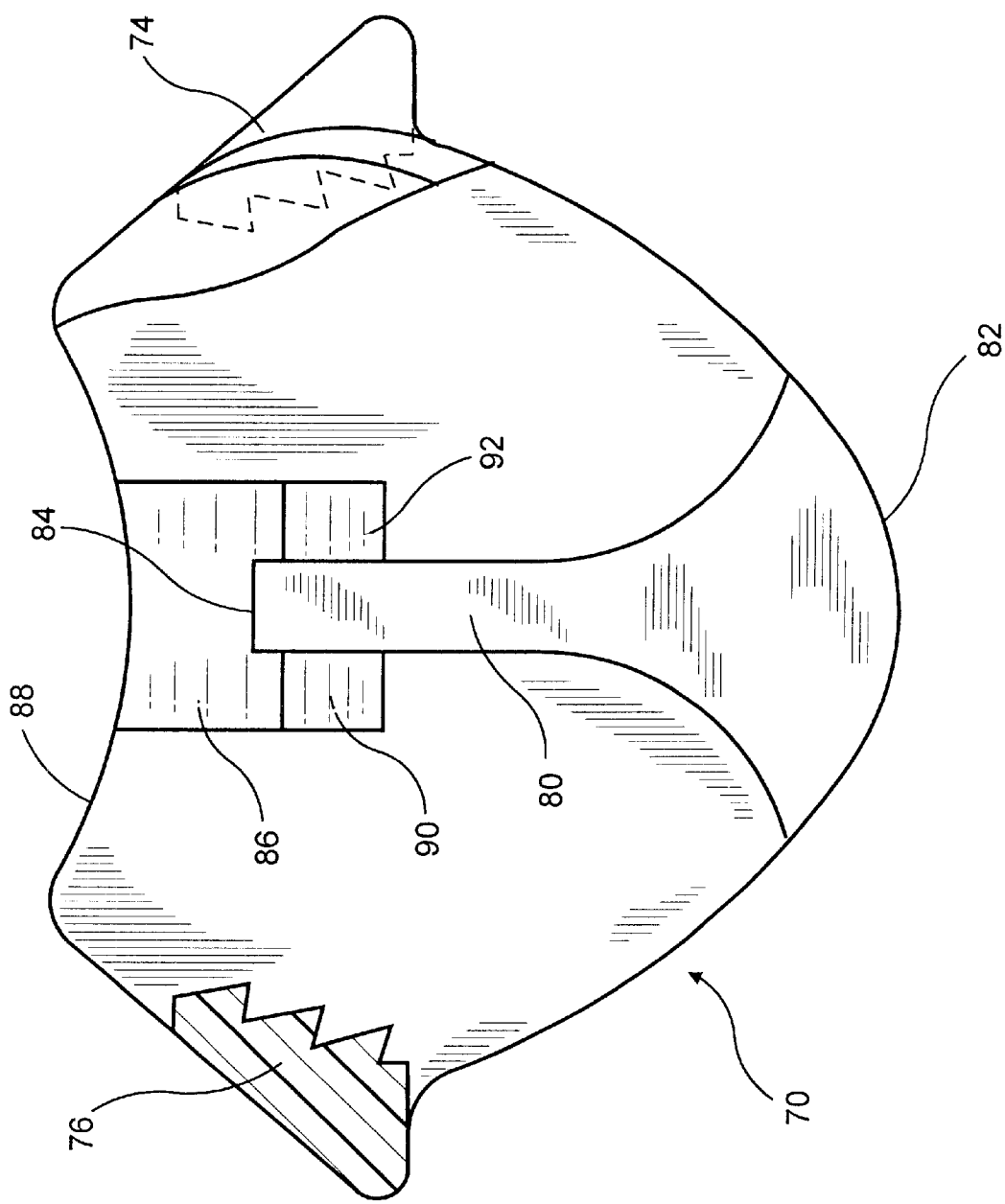
FIG. 8 is a plan view of a second aspect of the female element of the zipper attachment of the present invention.

Female portion 14 includes first and second faces 70, 72 separated by supports 74, 76 with passageway 78 formed therebetween (see FIG. 1). As shown in FIG. 8, supports 74, 76 may have internal striations 98 to increase the holding capacity. As shown in FIGS. 3 and 4, face 70 includes guide channel 80 with broadly opening mouth 82. Guide channel 80 terminates at wall 84. Guide channel 80 receives guide ridge 30 of male element 12 in the installed configuration (see FIGS. 5, 6 and 7).

Figure 5:
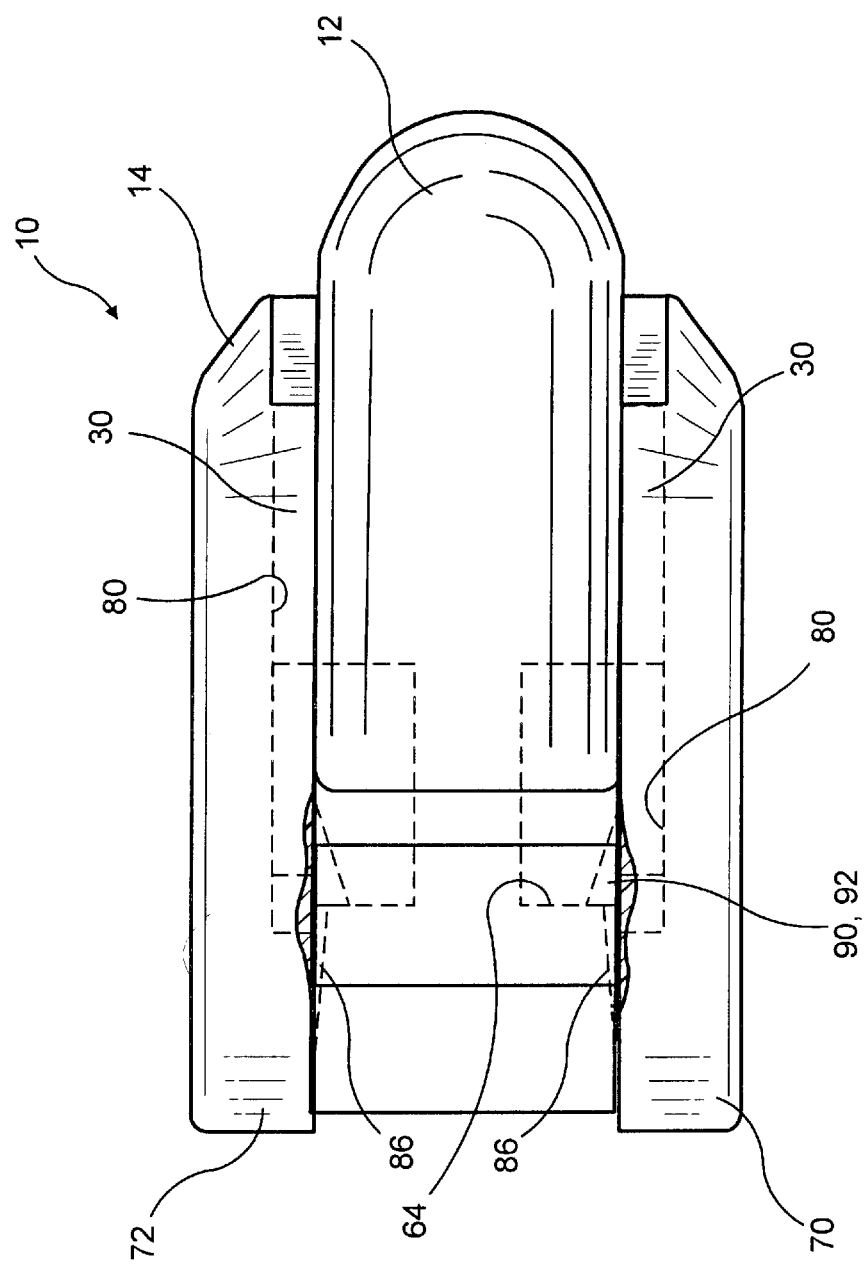
FIG. 5 is a cross-sectional view showing the engagement of the male and female elements of the zipper attachment of the present invention.

Inclined surface 86 extends from a central area of upper arcuate surface 88 to beyond wall 84 of guide channel 80. Ramped detent surfaces 90, 92 rise proximate to wall 84 which terminates guide channel 80. It is envisioned that first and second faces 70, 72 are otherwise identical except that only one face needs to include ramped detent surfaces 90, 92. When male element 12 is inserted into female element 14, upper ramped edge 62 ramps over ramped detent surfaces 90, 92, then detent surfaces 90, 92 engage upper detent wall 64 of male element 12 as shown in FIG. 5.

In order to use zipper attachment 10, the user typically starts with male element 12 separate from female element 14. The user then loops cord 100 through eyelet 202 or similar aperture of zipper slider 200 and feeds the ends 102, 104 (which are typically melt cut to eliminate raveling) of cord 100 between faces 70, 72 of female element 14 and into cord channels 44, 46 of male element 12 to reach the pre-loaded configuration shown in FIG. 1. Barbs 22, 24 act as interference points to hold ends 102, 104 of cord 100 in place during assembly. The user pulls the male element 12 into the female element 14 by pulling cord 100 from the slider side of the female element 14. This directs guide ridge 30 of male element 12 into guide channel 80 and urges male element 12 into female element 14. The user then typically snaps the male and female elements 12, 14 together, perhaps using the thumb and forefinger or other appendages. This causes upper ramped edge 62 to ramp over ramped detent surfaces 90, 92, and ramped detent surfaces 90, 92 to detent engage upper detent wall 64 of male element 12 to reach the configuration shown in FIGS. 6 and 7. Ends 102, 104 of cord 100 are then held in place by points 48, 50 and supports 74, 76. The user can then freely slide zipper slider 200 by grasping zipper attachment 10 and pulling zipper attachment 10 in the desired direction. Pulling on cord 100 urges male element 12 more tightly into female element 14. More specifically, pulling on cord 100 tightens the grip on ends 102, 104 of cord 100 by points 48, 50 and supports 74, 76.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A cord attachment including:
    a female element with a passageway therethrough, said passageway including first guide elements and first detent elements;
    a male element to be received in said passageway, said male element including second guide elements to engage said first guide elements and second detent elements for engaging said first detent elements;
    wherein said first guide elements include at least one guide slot formed on an internal wall of said female element and wherein said second guide elements include at least one guide ridge formed on an external surface of said male element;
    said male element further including cord channels for receiving ends of a cord and securing the ends of the cord when said male element is received in said passageway of said female element; and
    wherein pulling the cord tightens a grip on the ends of the cord in said cord channels.

2. The cord attachment of claim 1 wherein said cord channels include barbs for securing the ends of the cord.

3. The cord attachment of claim 1 wherein said female element includes internal striations which extend into said cord channel in an installed position.

4. The cord attachment of claim 1 wherein said at least one guide slot terminates at a slot end on said internal wall.

5. The cord attachment of claim 4 wherein said first detent element includes at least one ramped surface on said internal wall.

6. The cord attachment of claim 5 wherein said at least one ramped surface is formed proximate to said slot end.

7. The cord attachment of claim 6 wherein said second detent element includes a detent wall in said male element.

8. The cord attachment of claim 7 wherein said detent wall is transverse to said at least one slot and engages said at least one ramped surface when said male element is fully inserted into said female element.

9. The cord attachment of claim 8 wherein said male element includes a ramped edge to ramp over said at least one ramped surface during initial insertion of said male element into said female element.

10. The cord attachment of claim 9 wherein said male element further includes wing elements which form an exterior side of said cord channels and which form an exterior surface extending from said passageway of said female element when said male element is fully inserted into said female element.

11. The cord attachment of claim 10 wherein said at least one guide channel includes an expanded mouth for initially receiving said at least one guide ridge.

12. A zipper cord assembly comprising:
    a zipper slider;
    a cord attached to said zipper slider and having a first end and a second end;
    a female portion including a first face that includes a guide channel; a second face opposite said first face; a first support and a second support separating said first face and said second face; a passageway formed between said first support and said second support; and a first detent element; and
    a male portion including an exterior surface terminating in a first member and a second member; a shank centrally positioned on said male portion and extending from said first member and said second member, said shank including opposite first and second sides, a longitudinal guide ridge received by the guide channel of said female portion, and a boss portion extending from an end of said shank; a first cord channel defined by said first member, said boss and said first side of said shank, wherein said first end of said cord is received by said first cord channel; a second cord channel defined by said second member, said boss and said second side of said shank, wherein said second end of said cord is received by said second cord channel; and a second detent element positioned on said boss and adapted to detent engage said first detent element thereby completing the zipper cord assembly.

13. The zipper cord assembly of claim 12 wherein said first and second cord channels include barbs for securing said first and said second end of said cord.

14. The zipper cord assembly of claim 13 wherein said first detent element includes at least one ramped surface on an internal wall of said female portion and said second detent element includes a detent wall in said male portion.

15. The zipper cord assembly of claim 14 wherein said detent wall engages said ramped surface when said male portion is fully inserted into said female portion.

16. An attachment device comprising:

a female portion including a first face that includes a guide channel; a second face opposite said first face; a first support and a second support separating said first face and said second face; a passageway formed between said first support and said second support; and a first detent element; and a male portion including an exterior surface terminating in a first member and a second member; a shank centrally positioned on said male portion and extending from said first member and said second member, said shank including opposite first and second sides, a longitudinal guide ridge received by the guide channel of said female portion, and a boss portion extending from an end of said shank; a first cord channel defined by said first member, said boss and said first side of said shank, said first cord channel being constructed and arranged to receive a first end of a cord; a second cord channel defined by said second member, said boss and said second side of said shank, said second cord channel being constructed and arranged to receive a second end of a cord; and a second detent element positioned on said boss and adapted to detent engage said first detent element.

17. The attachment device of claim 16 wherein said first and second cord channels include barbs for securing ends of a cord.

18. The attachment device of claim 17 wherein said first detent element includes at least one ramped surface on an internal wall of said female portion and said second detent element includes a detent wall in said male portion.

19. The attachment device of claim 18 wherein said detent wall engages said ramped surface when said male portion is fully inserted into said female portion.

* * * * *